May 26, 1964

R. W. TACCONE 3,134,148

MULTIPLE LAYER DIAPHRAGM AND MOLDING
MACHINE IN COMBINATION THEREWITH

Filed Aug. 10, 1961

INVENTOR.
RUSSELL W. TACCONE
BY
Charles L. Lovercheck
attorney

May 26, 1964 R. W. TACCONE 3,134,148
MULTIPLE LAYER DIAPHRAGM AND MOLDING
MACHINE IN COMBINATION THEREWITH
Filed Aug. 10, 1961 7 Sheets-Sheet 2

FIG. 1A

INVENTOR
RUSSELL W. TACCONE
BY
Charles L. Lornelach
attorney

RUSSELL W. TACCONE
INVENTOR.

United States Patent Office 3,134,148
Patented May 26, 1964

3,134,148
MULTIPLE LAYER DIAPHRAGM AND MOLDING MACHINE IN COMBINATION THEREWITH
Russell W. Taccone, Erie, Pa., assignor to Taccone Corporation, North East, Pa., a corporation of Pennsylvania
Filed Aug. 10, 1961, Ser. No. 130,640
7 Claims. (Cl. 22—46)

This invention relates to molding machines and, more particularly, to the type of molding machine known as a diaphragm molding machine wherein a head having a cavity therein and a flexible diaphragm covering the cavity and sealed at its edges are provided. The diaphragm engages the sand to compress it.

It has been difficult to provide a diaphragm of this type strong enough to contain the pressure required for molding and, at the same time, flexible enough to form a mold without contour molding the sand. It has been discovered that by making the diaphragm of several layers of individual sheets, it will be flexible enough to accomplish the desired degree of molding; yet, the edges thereof will not be pulled out of their attaching means to the molding head and the diaphragm will have enough flexibility to adjust its shape to the surface of the mold.

It is necessary that the correct clamping force be exerted on the periphery of a molding head diaphragm to hold it in place and, yet, a means be provided to prevent an extensive force to be exerted on the diaphragm around the peripheral edges during molding, thus exceeding the yield point of the material. The present invention makes it possible to accomplish these two ends by providing a device to carry the excess force exerted by the sand on the head by means of a rigid member extending through or around the edge of the diaphragm. By providing a suitable number of layers of diaphragm, a lubricant can be put between the layers thereof.

In one form of the invention, the means to limit the compressive force is a spacer between the parts of the head or frame which support the diaphragm. In addition to the compression limiting member, a tension member is provided to exert a compressive force on the diaphragm.

An improved diaphragm is also disclosed which is made of three dissimilar layers of sheet like material. One layer is an air tight layer, the second layer a strong web layer such as fabric woven from a strong material such as nylon cord, and the third layer is made of an abrasion resistant material such as urethane. The first layer may be relatively thick to limit its flexure, yet give some flexibility.

It is, accordingly, an object of the present invention to provide an improved flexible diaphragm for a diaphragm molding machine.

Another object of the invention is to provide a flexible diaphragm made of a plurality of thicknesses of separate sheets of material for a diaphragm molding machine.

Still another object of the invention is to provide an improved means for attaching the edge of a diaphragm to a molding head.

Yet another object of the invention is to provide an improved clamping means for clamping a diaphragm to a molding machine.

A further object of the invention is to provide an improved diaphragm.

A still further object of the invention is to provide a diaphragm for a molding machine which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figures 1, 2, 3:
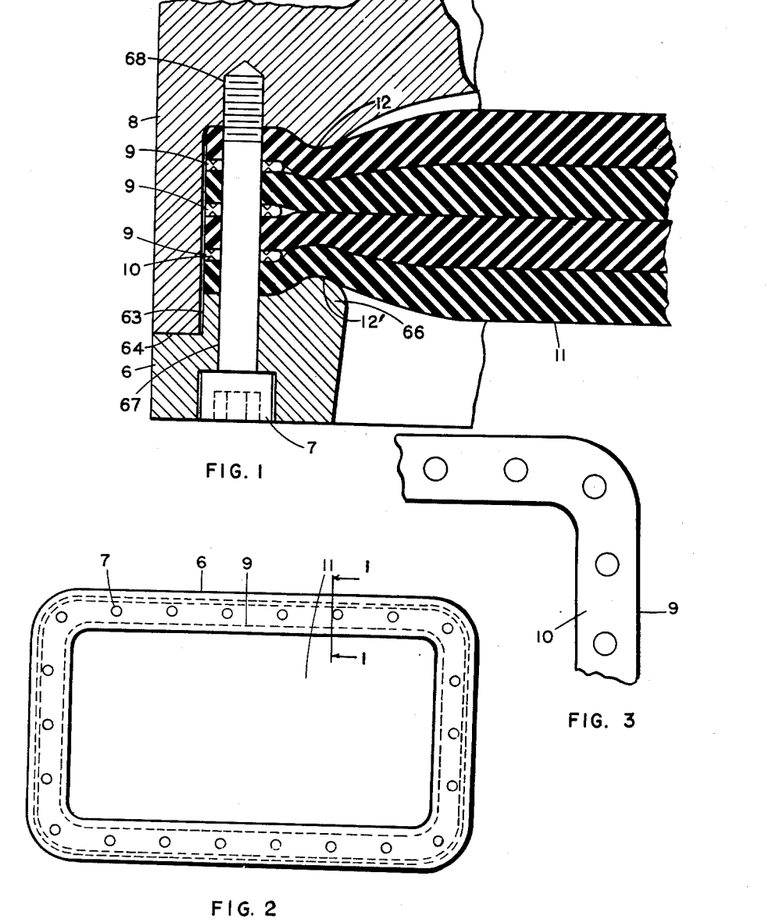
FIG. 1 is an enlarged sectional view taken on line 1—1 of FIG. 2 of a part of the machine shown in FIG. 1A.
FIG. 2 is a bottom view taken on line 2—2 of FIG. 1A.
FIG. 3 is an enlarged partial view of a part of the frame around the head.
Figure 1A:
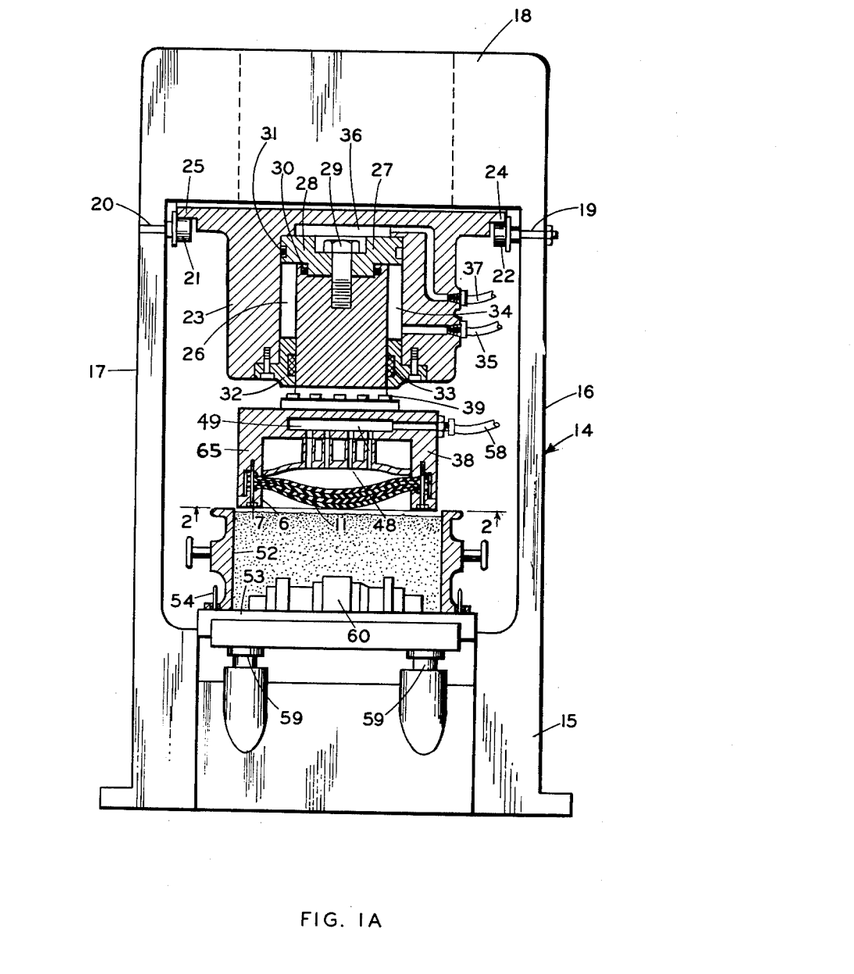
FIG. 1A is a longitudinal cross sectional view of a molding machine according to the invention.

Now with more specific reference to the drawings, FIG. 1 shows a frame 14 having a base 15 with upstanding sides 16 and 17 supporting a transverse top member 18. The sides 16 and 17 have axles 19 and 20 thereon supporting wheels 21 and 22 which form a roller conveyor on which rest flanges 24 and 25 which support a head 23.

The head 23 has a cylindrical bore 26 therein which slidably receives a piston 27. The piston 27 has a flanged member 28 attached to the upper end thereof by means of a bolt 29 which extends through a bore and a counterbore in the flange and engages a threaded hole in the lower part of the piston. An O-shaped sealing washer 30 is received in a groove 31 and acts as a piston ring and prevents any oil from leaking past the edge of the flange.

A seal made up of an annular member 32 is bolted to the lower end of the cylinder and it has a groove therein which receives a packing 33 which slidably engages the inner surface of the piston 27 to prevent leakage around the piston. Since the lower part of the piston is smaller than the cylindrical bore 26, a chamber 34 is provided below the flanged member 28 and around the peripheral edges of the lower part of the piston. This provides an upward force on the flange member 28 of the piston 27 when pressure fluid is admitted to the chamber 34 through a line 35. A chamber 36 above the piston receives hydraulic fluid from a line 37 to force the piston 27 down.

A movable part 38 of the head 23 is attached to the piston by means of bolts 39. The head has a cavity 48 formed therein which communicates with a chamber 49 from an air line 50. A diaphragm 11 has its peripheral edges attached to the head 23 and forms a sealing closure for the cavity therein.

Flasks 52 are supported on pattern plates 53 and are held in place by locating pins 54. The flasks 52 are of usual design and the pattern plates may be raised to molding position and lowered by means of suitable pistons 59 in the base 15. A pattern character 60 is supported on the pattern plate 53 as shown.

The movable part 38 of the head 23 is slightly smaller in cross section than the inside of the flask so that it will slide down into the flask to compress the sand therein when the piston 27 is lowered and may be lifted above the flask after the sand is compressed so that the flask can be slid out from under the head and be replaced by another flask.

A peen block frame 6 is attached to the head 23 by means of bolts 7. The peen block frame 6 has an opening at the center thereof which is closed by the diaphragm 11. The frame 6 has a reduced size part 63 which fits inside a flange 8 on a side 65 of the part 38 of the head and a shoulder 64 abuts against the lower end of the flange. The head has a rib 12 generally semi-circular in cross section as shown which extends around the inside of the head and indents into the diaphragm. Likewise, a rib 66 extends around the upper side of the peen frame 6 and embeds itself into the diaphragm at 12'.

The diaphragm 11 is made of four sheets, for example, and the peripheral edges of these sheets are compressed between the peen block frame 6 and the flange 8 of the head 23. The semi-cylindrical ribs 12 and 66 embed themselves in the diaphragm 11 and squeeze these edges. This provides an air tight seal and, at the same time, prevents the diaphragm from being pulled out from between the head and peen frame. The flange 8 takes the compressive force exerted by the sand on the peen frame so that the diaphragm is not squeezed out.

Figures 4, 7, 8, 9:
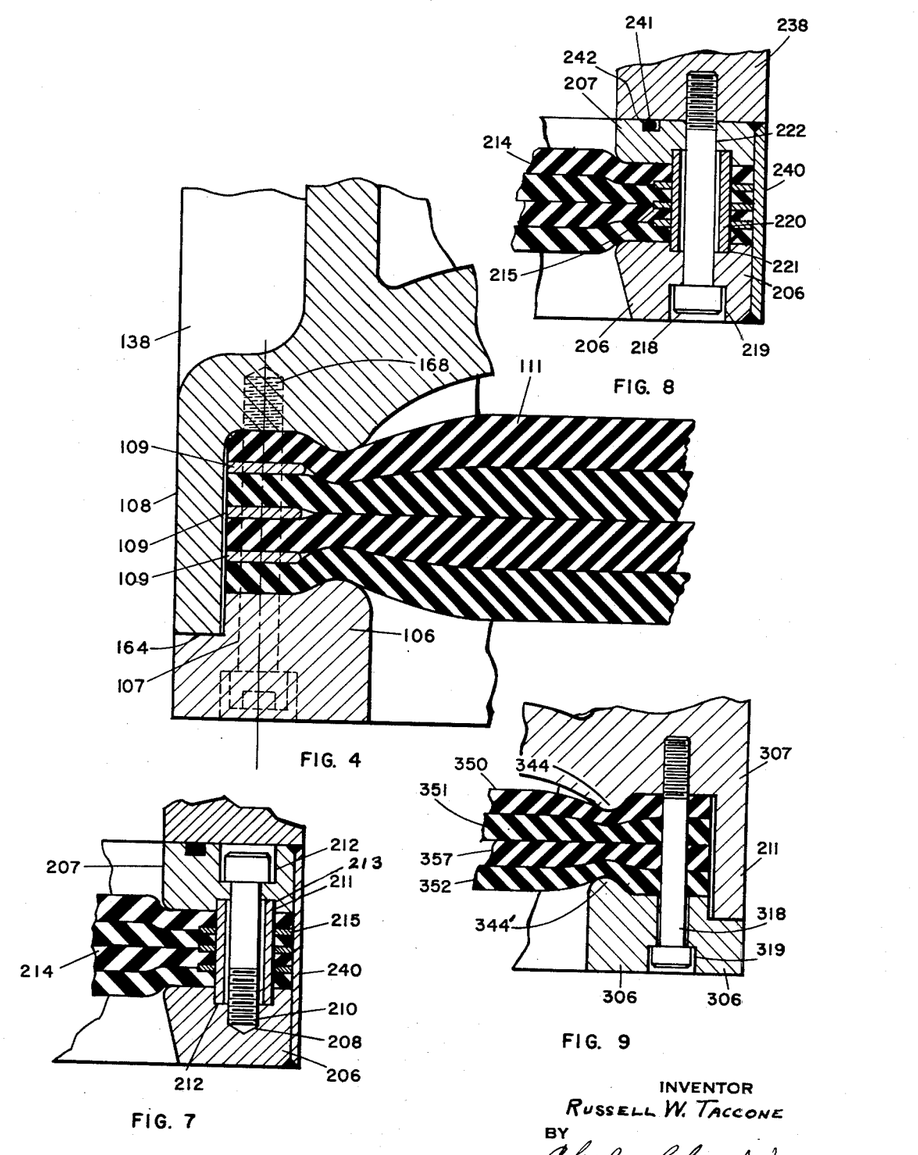
FIG. 4 is a partial cross sectional view of another embodiment of the invention.
FIGS. 7 and 8 are longitudinal cross sectional views of still another embodiment of the invention.
FIGS. 9, 10, and 10A are longitudinal cross sectional views similar to FIG. 1 of other embodiments of the invention.

In the embodiment of the invention shown in FIG. 4, a head 138 similar to the movable part 38 of the head in FIG. 1 is shown having an integral flange 108 extending downwardly therefrom and forming a recess to receive the edges of a flexible multi-layer diaphragm 111. This diaphragm has spacer members 109 therebetween which are plain and have no grooves as shown in FIG. 1 at 10. These spacers may be in the form of disks as in FIGS. 16, 17, and 18 or they each could be a continuous open frame the same shape as the peen frame.

The peen frame 106 has a groove 164 around the outside thereof which receives the flange 108 as in FIG. 1 and the peen frame 106 locks the diaphragm 111 into position between it and the head 138. The peen frame is held in place by bolts 107 which extend through holes in the peen frame and up through holes in the diaphragm and in the spacer members 109 and engage threaded holes 168 in the head. The flange 108 holds the peen frame 106 in spaced relation to the head so that the compressive force of the head on the sand is taken by flange 108, not by the diaphragm.

Figure 5:
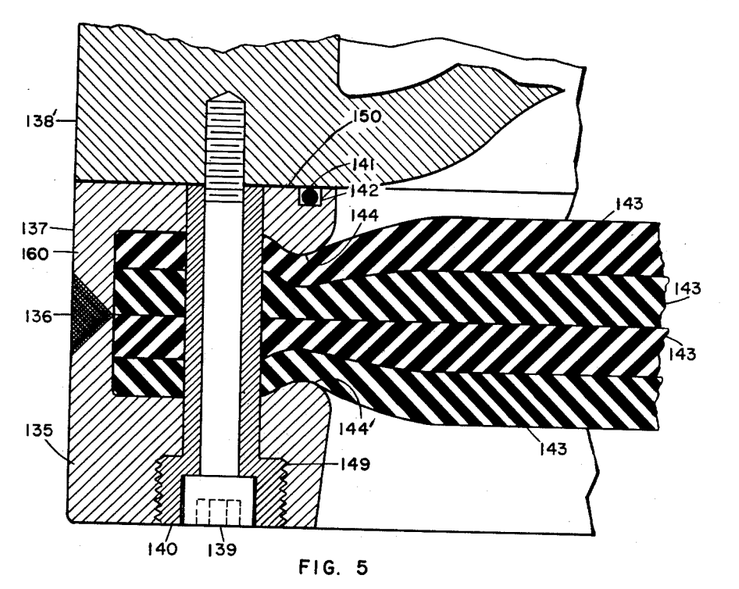
FIG. 5 is a longitudinal cross sectional view of another embodiment of the invention.
Figure 6:
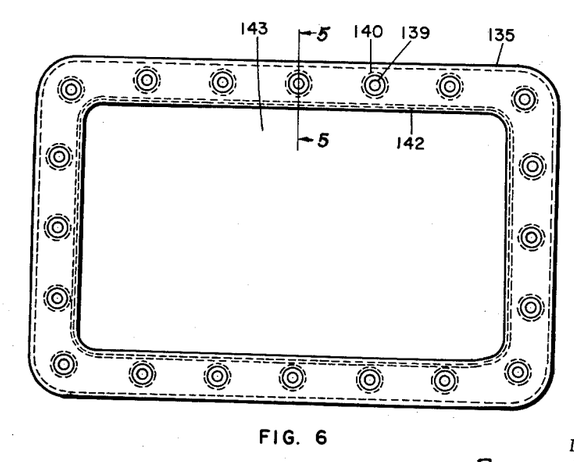
FIG. 6 is a view similar to FIG. 2 of the embodiment of the invention shown in FIG. 5.

In the embodiment of the invention shown in FIGS. 5 and 6, the movable part of a head 138' terminates in a flat lower surface around the outer periphery thereof indicated at 150 and this part of the head lies against a peen frame 137. The peen frame 137 is made of two angle members 135 and 160 which are welded together at 136 and provide a channel therebetween which extends around the inside of the peen frame. The angle members 135 and 160 have semi-circular ribs 144 and 144' thereon which extend entirely around the opening in the head and embed themselves in the periphery of the diaphragm as shown. A groove 142 is formed at the top of the angle member 160 which receives an O-ring 141. The O-ring 141 forms a seal between the side of the head 138' and the peen frame 137. Threaded tubular sleeves 140 have a head which is threadably received at 149 in the peen frame and through the sleeves 140 extend bolts 139 which threadably engage threaded openings in the head 138'.

In order to assemble the device, the members 135 and 160 are clamped onto the diaphragm and the edge thereof may be welded or brazed at 136. Then the sleeves 140 are put in place through the openings in the diaphragm and the threaded head tightened. Thus, the frame and diaphragm are assembled as a unit. Then the bolts 139 are extended therethrough and threadably attached to the head.

The sleeves 140 form a large bearing surface inside the holes in the diaphragm and prevent the holes from tearing out. The sleeves also hold the ribs 144 and 144' in spaced relation and limit the compressive stress on the diaphragm between the ribs 144 and 144' when the peen frame 137 is forced against the sand during a molding cycle.

In the embodiment of the invention shown in FIGS. 7 and 8, the clamping means and support members are disposed around under the frame of FIG. 2. An outer frame 206 and an inner frame 207 are coextensive with each other and they clamp the edges of a diaphragm 214 between them. The inner frame 207 is held to the diaphragm by bolts 208. The bolts 208 extend through a counterbore 212 of a hole 209 in the inner frame 207 and threadably engage a threaded hole 210 in the outer frame 206. A sleeve 211 is supported in the counterbores 212 in the frame 206 and a counterbore 213 in the outer frame 206 and it forms a compression member to hold the frames 206 and 207 in spaced relation. The sleeve 211 will be exactly the correct length to allow the two frames to move together the exact amount to exert the optimum compressive force on the peripheral edges of the diaphragm 214. The diaphragm 214 is shown made of four layers with rigid frame like spacers 215 therebetween. These spacers hold the edges of the diaphragm spaced to prevent removal from between the two frames. The inner frame 207 and the outer frame 206 are held together by a plate 240 to prevent the edges of the diaphragm from rubbing the inside of a flask.

FIG. 8 shows bolts 218 which threadably engage threaded holes in the bottom of the head and extend through a counterbored hole 219 in the frame 206 and through a similar hole in the inner frame 207. Sleeves 220 are supported in counterbores in holes 221 and 222 in the inner and outer frames, respectively, and these sleeves perform the same function as the sleeves 211. The spacers 215 extend around the frame as indicated.

By removing the bolts 218 from the head, the inner and outer frames with the diaphragm sandwiched therebetween can be removed as a unit and replaced by a similar framed diaphragm, thereby saving a great deal of time during production. Also, the diaphragms can be inserted and clamped between the inner and outer frames in a factory under controlled conditions. This will result in a much better job of assembly generally. The O-ring 241 is placed in a groove 242 to form a seal between the head 238 and frame 207.

In the embodiment of the invention shown in FIG. 9, a head 307 is attached to a peen frame 306 by bolts 318 which extend through counterbored holes 319 and clamp the four layer diaphragm together. A downwardly extending flange 311 holds the outer frame in spaced relation from the head 307 and the diaphragm is clamped between ribs 344 and 344'.

The diaphragm is made of an inner layer 350 of air impervious first intermediate material which may be rubber or the like, a second intermediate layer of rubber or the like indicated at 351, a layer 357 of high tensile strength material such as nylon webbing or the like, and an outer layer 352 of abrasion resistant material such as urethane or the like. The outer layer of abrasion resistant material prevents the impervious inner layers from injury by sharp objects which may be in the molding sand. The layer 357 of high tensile material will prevent the diaphragm from expanding unduly or bursting when the pressure remains therein and the diaphragm is taken out of engagement with the sand. The inner layers 350 and 351 will make the diaphragm air tight.

Figures 10, 10A, 11, 11A, 11B, 14, 15, 19:
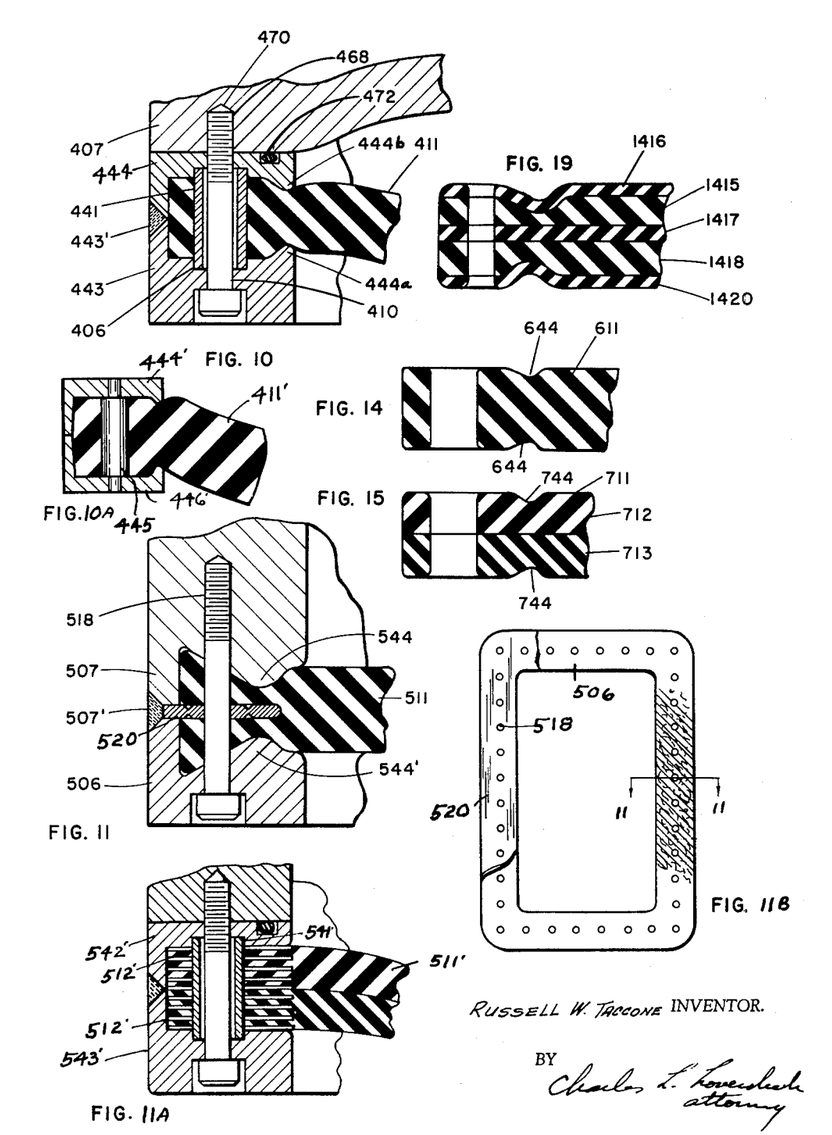
FIG. 11 is a view taken on line 11—11 of the embodiment of the invention shown in FIG. 11B.
FIG. 11A is a longitudinal cross sectional view of yet another embodiment of the invention.
FIG. 11B is a bottom view of the embodiment of the invention shown in FIG. 11.
FIGS. 14 to 26 inclusive are views of still further embodiments of the invention.

In the embodiment of the invention shown in FIG. 10, a head 407 is shown having an open cavity with an inner frame 444 attached to a head 406 by volts 410 and an outer frame 443 attached to the inner frame 444 by welding at 443'. A diaphragm 411 is made of a single sheet of heavy, thick, rubber like material with spaced holes therein receiving sleeves 441 which hold the inner and outer frames 444 and 443 in fixed spaced relation and prevent them from pinching the diaphragm 411 when a heavy force is impressed on the outer frame 443 during molding.

An O-ring 472 forms a seal between the inner frame and the head. Ribs 444a and 444b deform the diaphragm to hold it in position.

In the embodiment of the invention shown in FIG. 10A, a diaphragm 411' is held between members 446' and 444' which are held in spaced relation by a sleeve 445'.

In the embodiment of the invention shown in FIGS. 11 and 11A, a head 507 has an outer frame 506 welded to it at 507'. The head 507 and outer frame define a groove generally triangular in cross section with a rib 544 spaced inwardly from the outer edges. A spacer plate 520 is disposed in a groove in a diaphragm 511. The diaphragm could be bonded to the frame and welded at 507' to the peen frame.

FIG. 11A is similar to FIG. 11 but shows a spacer 541' between frames 542' and 543' and metallic inserts 512' in each layer 511' of the diaphragm.

Figures 12, 16, 17, 18:
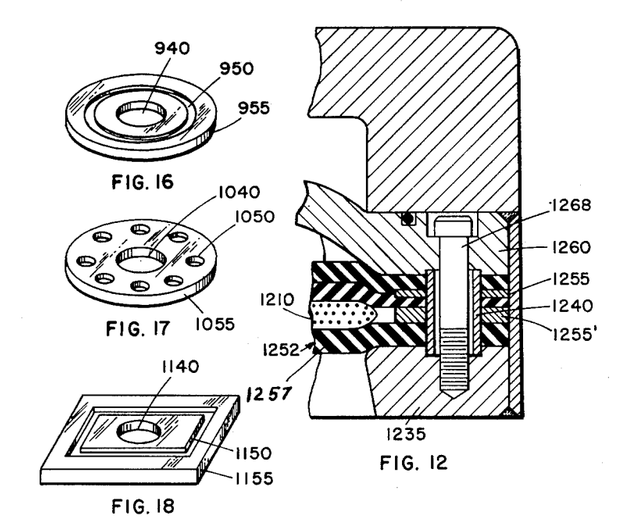
FIGS. 12 and 13 are cross sectional views of still other embodiments of the invention.

The embodiment shown in FIG. 12 discloses a diaphragm 1252 having an inner frame 1260 and an outer frame 1235 held in spaced relation by a sleeve 1240. A bolt 1263 clamps the inner and outer frames together.

The diaphragm 1252 is made up of four layers, including a layer 1257 of outer abrasion resistant material, an intermediate layer of woven material made of high tensile strength such as nylon cord, and two layers of air impervious material such as rubber. The edges of the diaphragm layers are held spaced by spaced washers 1255 and 1255'.

Figures 13, 13A:
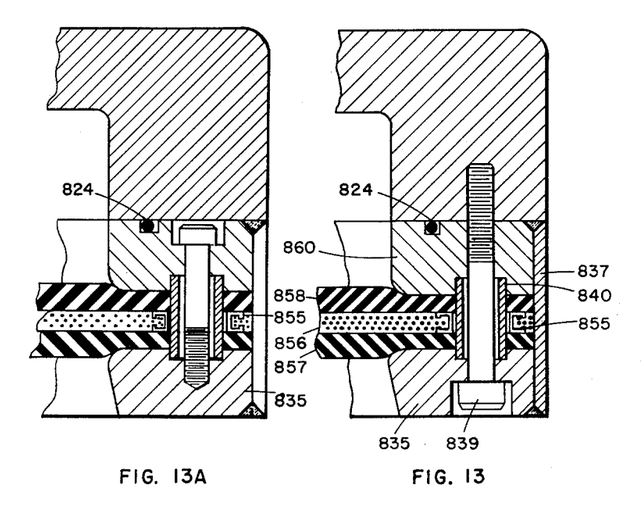
FIG. 13A is a cross sectional view of the embodiment of the invention shown in FIG. 13.

FIGS. 13 and 13A show an outer frame 835 welded to a peripheral plate 837 which is in turn welded to an inner frame 860 and forms a band around the head holding the frames 835 and 860 together. The frames 835 and 860 are held to the head by bolts 839. The bolts 839 extend through spacer sleeves 840. An O-ring 842 forms a seal between the head and the inner frame 860. A diaphragm 843 has spacer washers or eyelets 855 which are clamped to fabric tensile material 856. The material 858 is gas impervious and material 859 is friction resistant.

Alternate positions have bolts 868 which extend through the spacer sleeves 840. The bolts 868 hold the frames and diaphragm together as a unit when they are removed from the machine.

FIG. 14 shows an embodiment of a diaphragm which could be used with any of the heads shown. The diaphragm 611 is made of a single layer of heavy rubber like material with grooves 644 molded therein adjacent the periphery to receive ribs on a head to hold it in position.

In FIG. 15, a diaphragm 711 is made of two layers 712 and 713, one of which may be an abrasion resistant material nad the other an air impervious high tensile material. The diaphragm 711 has peripheral grooves 744 and 744' preformed or molded therein adjacent its peripheral edge so that the diaphragm will form an interlocking action with such ribs as are shown in FIGS. 4 and 5, for example.

FIGS. 16, 17, and 18 show various embodiments of spacers 955, 1055, and 1155, respectively, which may be used to substitute for the eyelets 855 shown in FIG. 13. The spacers are washer like members as shown having holes 940, 1040, and 1140, respectively, therein for receiving a bolt and either grooves 950 or 1150 or holes 1050 for deforming and functionally engaging the diaphragm.

In the embodiment of the invention shown in FIG. 19, a cross sectional view of a part of a diaphragm is shown wherein layers 1416 and 1417 may be of an impervious material such as a sheet of rubber and layers 1415 and 1418 may be very yieldable sheets of material such as sponge rubber. A layer 1420 could be of abrasion resistant material such as polyurethane. These layers are all clamped between a head member and a peen block member such as the members 506 and 507 in FIG. 11.

Figure 20:
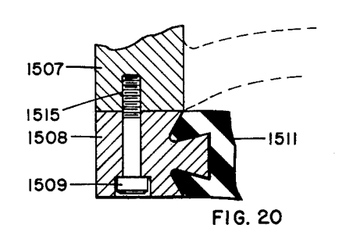
Figure 27:
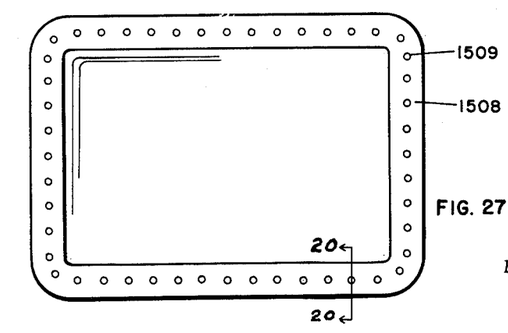
FIG. 27 is a bottom view of a molding head.

In the embodiment of the invention shown in FIGS. 20 and 27, a diaphragm 1511 is shown made of a heavy thick resilient material attached to a head 1507 by bonding to the dove tail edge of a peen frame 1508 held in place by bolts 1509. The bolts are threadably received in threaded holes 1515 in the head 1507.

Figure 21:
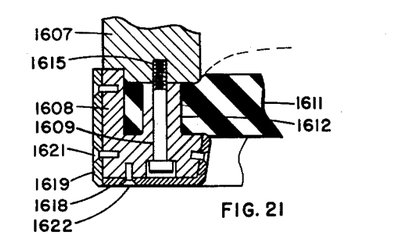

In the embodiment shown in FIG 21, a heavy thick flexible diaphragm 1611 is clamped in place on a head 1607 by a peen frame 1608 held in place thereon by bolts 1609 which engage threaded holes 1615 in the head 1607. The peen frame 1608 has spaced, upwardly extending, cylindrical bosses 1612 integrally attached thereto and having holes therein which receive the bolts 1609. These bosses carry the compressive force exerted by the bolts 1609. Cover plates 1618 and 1619 are held in place on the peen frame 1608 by means of screws 1621 and 1622. These cover plates cover the heads of the bolts 1609 and prevent sand from catching in crevices in the peen frame 1608.

Figure 22:
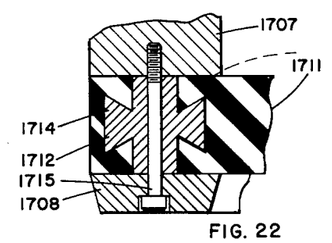

The embodiment of the invention shown in FIG. 22 discloses a head 1707 which has a heavy thick flexible diaphragm 1711 attached thereto by means of spacers 1712. The spacers are generally cylindrical and have flanges 1714 attached to their intermediate parts. These flanges are undercut as shown so that their outer periphery extends toward the end and radially outward. The spacers 1712 limit the compressive force exerted by bolts 1715 through a peen frame 1708 onto the diaphragm and also form a bearing area for supporting the diaphragm 1711 in place.

Figure 23:
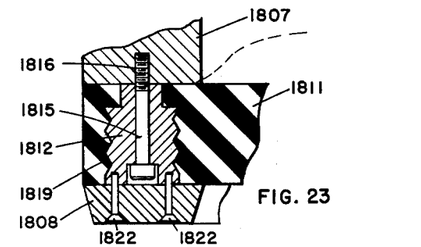

In the embodiment shown in FIG. 23, a machine frame 1807 is shown having a heavy thick resilient diaphragm 1811 attached thereto by means of spacers 1812. These spacers are generally cylindrical and they have a hole therein which receives a bolt 1815 which is threadably attached to the head at 1817. The spacers 1812 have ridges 1819 thereon which form an increased bonding arrangement for the diaphragm 1811. A peen frame 1808 is attached to the frame 1807 by means of bolts 1822.

Figure 24:
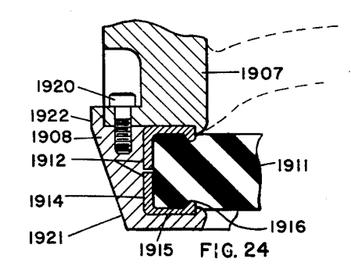

A head 1907 in the embodiment shown in FIG. 24 has a flexible heavy resilient diaphragm 1911 fixed thereto by means of angular frame members 1912, each of which has a peripheral leg 1914 and a laterally extending leg 1915 with a bead 1916 which embeds itself in the diaphragm as shown. These angular frame members are clamped between a peen frame 1908 and the head 1907. The peen frame 1908 is held to the head 1907 by means of studs 1920 which extend throughout the material in the head and downwardly as indicated. The peen frame 1908 tapers inwardly so that the lower edge at 1921 is of smaller peripheral length than the part at 1922, thus forming a clearance space as the frame enters the flask.

Figure 25:
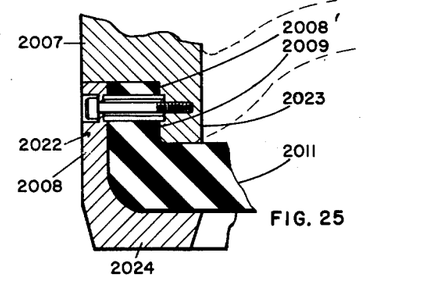

In the embodiment of the invention shown in FIG. 25, a head 2007 is shown with a peen frame 2022. The head has an undercut part at 2008 which receives an upwardly turned up end 2009 of a diaphragm 2011. The upwardly turned end 2009 is received between the peen frame 2022 and terminates at 2208'. The peen frame is L-shaped in cross section as shown.

An upwardly extending leg clamps the upwardly extending end 2009 of the diaphragm 2011 between it and a downwardly extending part 2023 of the head and a horizontal leg 2024 of the peen frame underlies the diaphragm. It will be seen that the upwardly extending leg of the peen frame takes the compressive force exerted when the head is forced into the flask so that no compression is exerted on the diaphragm.

Figure 26:
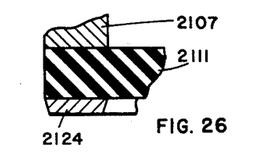

FIG. 26 shows an embodiment of the invention wherein no spacer or other means is provided to carry the compressive force between a peen frame 2124 and a head 2107 so that the diaphragm 2111 will be compressed by the compressive force of the head and extruded outwardly if some means such as the upwardly extending leg in FIG. 25 or the spacers 1812 in FIG. 23 were not provided.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising means to support a flask, a head supported on said machine spaced relative to said flask and adapted to be moved into engagement with sand adapted to be supported in said flask, said head having an open cavity therein, a diaphragm, means to support said diaphragm on said head closing said cavity, said means to support said diaphragm comprising an inner open frame and an outer open frame generally coextensive with each other and having the peripheral edges of said diaphragm supported therebetween, said inner and outer frames being held in spaced relation by sleeves between said frames engaging said frames and extending through holes in said diaphragm, some of said sleeves having threaded bolts extending through one said frame and engaging the other said frame holding said frames together, other said sleeves having threaded bolts extending through said frames and said sleeves and engaging said head to hold said frames to said head, and sealing means to form a seal between said head and said frames.

2. A molding machine comprising a head having a cavity therein, and a diaphragm closing said cavity, said diaphragm being made up of three layers of material, the first layer comprising a material impervious to fluids and having generally the properties of rubber, the second layer comprising a woven material having the high tensile properties of nylon, and the third and outer layer being made of a urethane like material having high abrasive resistance.

3. A molding machine comprising a head having a downwardly opening cavity therein, a diaphragm supported on its edges around said cavity, a peen frame on the edge of said diaphragm, means clamping said peen frame to said head, and spaced sleeves extending through said peen frame and engaging said head to hold said peen frame in spaced relation from said head whereby the force on said diaphragm by said peen frame is limited.

4. A molding machine comprising a head having a downwardly opening cavity, an inner frame, means attaching said frame to said cavity, an outer frame, a sheet like diaphragm, the outer edge of said diaphragm being disposed between said inner frame and said outer frame, bolts extending through said diaphragm and attaching said frames to said head, sleeves between said inner frame and said outer frame, and bolts extending through said frames, said sleeves holding said frames in spaced relation.

5. A molding machine comprising means to support a flask, a head supported above said flask and adapted to move into engagement with sand supported therein, said head having a downwardly open cavity therein, an internal, inwardly facing groove in said head around the inside of said cavity receiving the peripheral edges of a flexible diaphragm, said flexible diaphragm comprising a plurality of separate sheets of flexible material each being coextensive with the other, a rib fixed to the part of said head defining said groove and extending around the upper side of said groove and being generally semi-circular in cross section, a rib fixed to said head and extending around the lower part of said groove generally semi-circular in cross section, means to hold said ribs together in fixed spaced relation and to embed said ribs in said diaphragm, the lower member defining the lower part of said groove being separable from said head, said means to hold said ribs together comprising sleeves between said lower member and said head, and spaced bolts extending through said separable member and said sleeves and threadably engaging the other side thereof over said sides to said diaphragm.

6. A molding machine comprising means to support a flask, a head supported above said flask and adapted to move into engagement with sand supported therein, said head having a downwardly open cavity therein, an internal, inwardly facing groove in said head around the inside of said cavity receiving the peripheral edges of a flexible diaphragm, said flexible diaphragm comprising a plurality of separate sheets of flexible material each being coextensive with the other, a rib fixed to the part of said head defining said groove and extending around the upper side of said groove and being generally semi-circular in cross section, a rib fixed to said head and extending around the lower part of said groove generally semi-circular in cross section, means to hold said ribs together in fixed spaced relation and to embed said ribs in said diaphragm, the lower member defining the lower part of said groove being separable from said head, spaced bolts extending through said separable member and threadably engaging the other side thereof over said sides to said diaphragm, spaced open frame members disposed between said sheets of material in said inwardly facing groove, said bolts extending through said frame members, said spaced members having grooves therein extending around each side thereof, a frame member, the legs of said frame member being bored, a sleeve member extending through said bore and through said sheets, and a bolt extending through said sleeve member and threadably engaging said head, limiting said groove in said head to a predetermined width.

7. The machine recited in claim 5 wherein spaced open frame members extending around said head are disposed between said sheets of material in said inwardly facing groove and said bolts extend through said frame members.

References Cited in the file of this patent
UNITED STATES PATENTS

| | | |
|---|---|---|
| 2,659,565 | Johnson et al. | Nov. 17, 1953 |
| 2,766,350 | Gres et al. | Oct. 9, 1956 |
| 2,767,446 | Pray | Oct. 23, 1956 |
| 2,771,850 | Wheelon | Nov. 27, 1956 |
| 2,791,013 | Demmler | May 7, 1957 |
| 2,805,455 | Whitesell | Sept. 10, 1957 |
| 2,962,775 | Rekart | Dec. 6, 1960 |
| 2,962,776 | Taccone | Dec. 6, 1960 |